United States Patent [19]

Choate

[11] Patent Number: 5,576,964
[45] Date of Patent: Nov. 19, 1996

[54] SYSTEM AND METHOD FOR RELATING A PASSIVE SENSOR TO A GEOGRAPHIC ENVIRONMENT

[75] Inventor: William C. Choate, Dallas, Tex.

[73] Assignee: Texas Instruments Incorporated, Dallas, Tex.

[21] Appl. No.: 475,693

[22] Filed: Jun. 7, 1995

Related U.S. Application Data

[63] Continuation of Ser. No. 982,810, Nov. 30, 1992.

[51] Int. Cl.⁶ .......................... G01C 11/04; G06F 165/00
[52] U.S. Cl. .......................... 364/456; 364/453; 382/106
[58] Field of Search ...................... 364/453, 454, 364/458, 456, 514, 516, 443, 449; 382/103, 106, 190; 342/66, 64; 348/116, 117, 147, 139

[56] References Cited

U.S. PATENT DOCUMENTS

| | | | |
|---|---|---|---|
| 4,700,307 | 10/1987 | Mons et al. ............................ | 364/453 |
| 4,988,189 | 1/1991 | Kroupa et al. ............................ | 356/4 |
| 5,072,396 | 12/1991 | Fitzpatrick et al. ..................... | 364/450 |
| 5,087,916 | 2/1992 | Metzdorff et al. ........................ | 342/64 |
| 5,142,659 | 8/1992 | Rao et al. ................................. | 382/9 |
| 5,144,373 | 9/1992 | Moler ........................................ | 356/2 |
| 5,146,228 | 9/1992 | Irani et al. ................................ | 342/64 |
| 5,214,720 | 5/1993 | Fety et al. ................................ | 382/48 |

*Primary Examiner*—Michael Zanelli
*Attorney, Agent, or Firm*—W. Daniel Swayze, Jr.; W. James Brady, III; Richard L. Donaldson

[57] ABSTRACT

A method and system are provided for relating a passive sensor (14) to a geographic environment (42, 44). The passive sensor (14) senses an image (40) of the geographic environment (42, 44). At least one feature (46) is extracted (26) from the image (40). At least one feature is generated (30) from map data (28) representative of the geographic environment. At least one extracted feature is related (22, 32) to at least one generated feature, such that the passive sensor (14) is related to the geographic environment (42, 44).

12 Claims, 2 Drawing Sheets

5,576,964

SYSTEM AND METHOD FOR RELATING A PASSIVE SENSOR TO A GEOGRAPHIC ENVIRONMENT

This is a continuation of application Ser. No. 07/982,810, filed Nov. 30, 1992.

TECHNICAL FIELD OF THE INVENTION

This patent application relates in general to image processing and in particular to a method and system for relating a passive sensor to a geographic environment.

BACKGROUND OF THE INVENTION

Where a sensor senses an image of a geographic environment, automatic target recognition ("ATR") is assisted by relating the sensor to the geographic environment. The sensor can be either a passive sensor such as a FLIR sensor or an active sensor such as a LADAR or RADAR sensor. A passive sensor emits relatively little energy and primarily detects energy, such as black body radiation, emitted by a source other than the system to which the passive sensor belongs. A passive sensor is useful for measuring a velocity perpendicular to the sensor's line of sight, such as a velocity of a target object along a horizon between a sky and a planet's surface.

By comparison, an active sensor emits significant energy and primarily detects a reflection of its own emitted energy from the geographic environment. Active sensors are useful for typical "ranging" systems that determine a three-dimensional model of a geographic environment's topography. For example, an active sensor is useful for measuring a range of a target object away from the sensor, according to the travel time of a reflected energy pulse. Also, an active sensor is useful for measuring a velocity parallel to the sensor's line of sight, such as a velocity of a target object toward or away from the sensor, according to a frequency change of the reflected energy pulse.

Although an active sensor is practical for a diverse range of environmental conditions, a passive sensor advantageously consumes less power and is more covert. Previous techniques typically fail to relate a position and attitude of a passive sensor to a geographic environment. Accordingly, previous techniques typically fail to sufficiently reduce uncertainties concerning a target object's appearance in an image sensed by a passive sensor.

Thus, a need has arisen for a method and system for relating a passive sensor to a geographic environment, in which a position and attitude of the passive sensor are related to the geographic environment. Also, a need has arisen for a method and system for relating a passive sensor to a geographic environment, in which uncertainties are reduced concerning a target object's appearance in an image sensed by the passive sensor.

SUMMARY OF THE INVENTION

In a method and system for relating a passive sensor to a geographic environment, the passive sensor senses an image of the geographic environment. At least one feature is extracted from the image. At least one feature is generated from map data representative of the geographic environment. At least one extracted feature is related to at least one generated feature, such that the passive sensor is related to the geographic environment.

It is a technical advantage of the present invention that a position and attitude of the passive sensor are related to the geographic environment.

It is another technical advantage of the present invention that uncertainties are reduced concerning a target object's appearance in an image sensed by the passive sensor.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–4 of the drawings, like numerals being used for like and corresponding parts of the various drawings.

Figure 1:
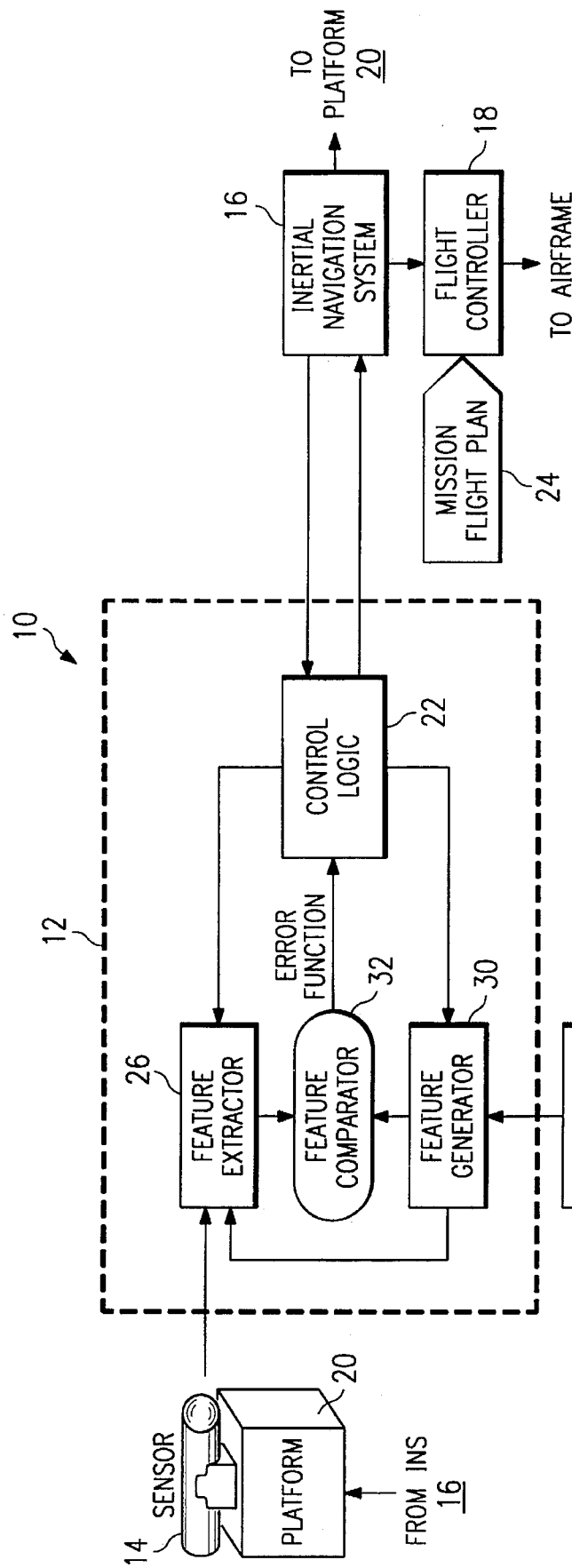
FIG. 1 is a block diagram of a navigation system, including process circuitry for relating a passive sensor to a geographic environment according to the preferred embodiment.

FIG. 1 is a block diagram of a navigation system, indicated generally at 10. System 10 includes process circuitry, indicated by dashed enclosure 12, for relating a passive sensor 14 to a geographic environment according to the preferred embodiment. In an exemplary embodiment, navigation system 10, process circuitry 12, and passive sensor 14 are carried aboard an air vehicle (not shown).

An inertial navigation system ("INS") 16 of system 10 is coupled to a flight controller 18 of system 10, to a platform 20 of system 10, and to control logic 22 of process circuitry 12. INS 16 outputs navigational information to flight controller 18, to platform 20, and to control logic 22. The navigational information includes an initial estimate of a position and attitude of the air vehicle relative to the geographic environment. In response to the navigational information, and in response to a stored mission flight plan 24, flight controller 18 controls movement of the air vehicle. Moreover, in response to the navigational information, platform 20 substantially stabilizes passive sensor 14 relative to the geographic environment.

Passive sensor 14 senses an image of the geographic environment. Passive sensor 14 is coupled to a feature extractor 26 of process circuitry 12, and passive sensor 14 outputs the sensed image to feature extractor 26. In response to the sensed image, feature extractor 26 extracts at least one feature from the sensed image. Such a feature is referred to as an extracted feature. Alternatively, such a feature can be referred to as an observed feature or as a scene feature. In exemplary embodiments, the extracted feature is a range discontinuity extracted by feature extractor 26 in response to intensity or color differences within the sensed image.

Storage circuitry 28 of system 10 stores digital data representative of a three-dimensional map of the geographic environment. Storage circuitry 28 is coupled to a feature generator 30 of processor circuitry 30, and storage circuitry 28 outputs the digital map data to feature generator 30. In response to the digital map data, feature generator 30 generates at least one feature from the map data. Such a feature is referred to as a generated feature. Alternatively, such a feature can be referred to as a synthetic feature. In exemplary embodiments, the generated feature is a range discontinuity generated by feature generator 30 in response to the map data.

Control logic 22 is coupled to feature extractor 26, to feature generator 30, and to a feature comparator 32 of process circuitry 12. Accordingly, in response to the sensed image from passive sensor 14, to the digital map data from storage circuitry 28, and to the navigational information from INS 16, process circuitry 12 relates at least one extracted feature to at least one generated feature, so that passive sensor 14 is related to the geographic environment. From control logic 22, INS 16 inputs an estimated position and attitude of passive sensor 14 relative to the geographic environment.

In response to the estimated position and attitude from control logic 22, INS 16 updates its navigational information. In this manner, system 10 advantageously reduces drift error of INS 16. Moreover, in principle, performance specifications of INS 16 can be greatly relaxed where no interludes occur during which system 10 might be inoperative, possibly as when flying across water.

Process circuitry 12 estimates the position and attitude of passive sensor 14 relative to the geographic environment by analyzing significant range discontinuities, such as by delineating a discontinuity contour boundary between objects at significantly different ranges away from passive sensor 14. For example, where a shorter range target object is static relative to a longer range target object, and where both target objects move relative to a sensor, the shorter range target object exhibits greater movement than the longer range target object in a sequence of images sensed by the sensor. This principle is demonstrated by optical flow of both target objects in the sequence of images.

Accordingly, process circuitry 12 delineates a discontinuity contour boundary to indicate a significant range discontinuity between objects at significantly different ranges away from passive sensor 14. In an exemplary embodiment where the geographic environment includes a sky and a planet's surface, process circuitry 12 delineates a horizon between the sky and the planet's surface to indicate a significant range discontinuity between the sky and the planet's surface, which are at significantly different ranges away from passive sensor 14. Normally, a horizon discontinuity contour boundary has sharp contrast and a well-defined location.

Figure 2:
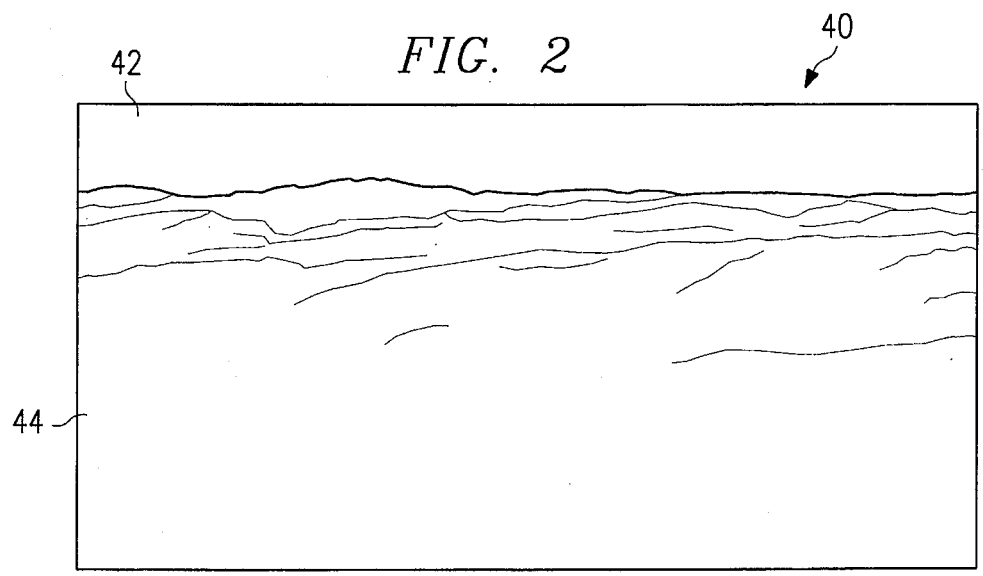
FIG. 2 is an exemplary image sensed by the passive sensor of a geographic environment.
Figure 3:
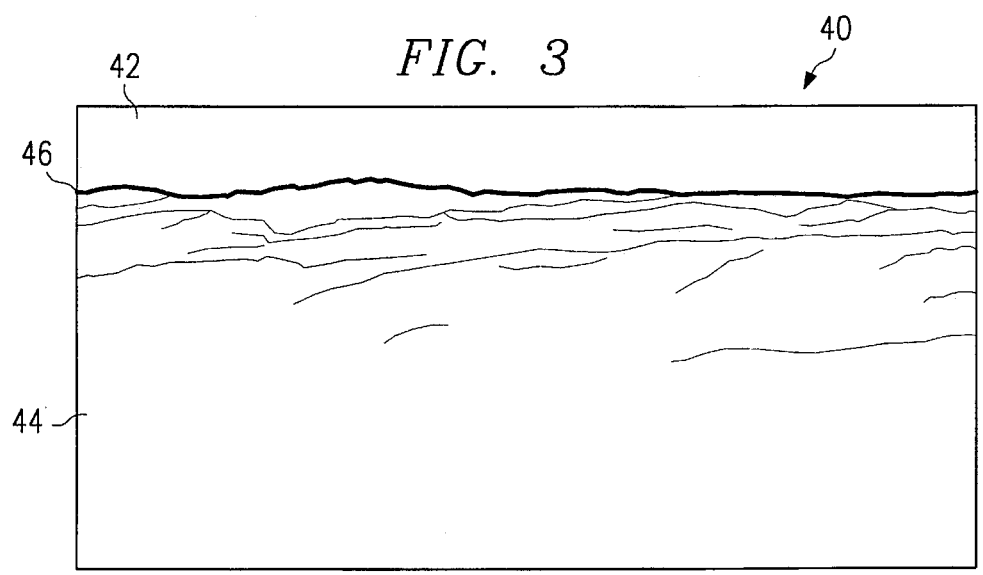
FIG. 3 illustrates a discontinuity contour boundary superimposed over the image of FIG. 2.

FIG. 2 is an exemplary image, indicated generally at 40, sensed by passive sensor 14 of a geographic environment including a sky 42 and a planet's surface 44. Image 40 is sensed by passive sensor 14 from an actual pose defined in terms of position and attitude. Referring to FIG. 3, in the exemplary embodiment, feature extractor 26 extracts significant range discontinuities to delineate an observed horizon 46 between sky 42 and surface 44, in response to intensity and color differences within image 40.

Feature generator 30 generates significant range discontinuities to delineate a synthetic horizon between the sky and the planet's surface, in response to the map data from storage circuitry 28 as viewed by a hypothetical observer from an assumed pose. Feature comparator 32 inputs the synthetic horizon from feature generator 30 and inputs the observed horizon from feature extractor 26. Feature comparator 30 determines a difference between the synthetic horizon and the observed horizon. In response to the difference, feature comparator 30 outputs an error function value $\rho$ to control logic 22. In an exemplary embodiment, the error function value $\rho$ is determined according to a linear least squares cost function.

In response to the error function value $\rho$, control logic 22 adjusts the assumed pose used by feature generator 30. Feature generator 30 generates a new synthetic horizon as viewed by a hypothetical observer from the assumed pose as adjusted by control logic 22. Feature comparator 32 outputs a new error function value $\rho$ indicating a difference between the new synthetic horizon and the observed horizon. In response to the new error function value $\rho$, control logic 22 readjusts the assumed pose used by feature generator 30.

In this manner, process circuitry 12 correlates the observed horizon with multiple synthetic horizons. Each of the synthetic horizons corresponds to a respective assumed pose and to a respective error function value $\rho$. Control logic 22 selects the assumed poses to be centered at an initial resolution around a position and attitude indicated by navigational information from INS 16. The initial resolution is a function of an estimated reliability of navigational information from INS 16. More particularly, the initial resolution is selected so that the domain of assumed poses has a 99% probability of encompassing the actual pose of passive sensor 14. The position and attitude indicated by navigational information from INS 16 should accord with the nominal position and attitude indicated by mission flight plan 24. Accordingly, position and attitude are known within rather narrow limits throughout the mission, so that computational demands of process circuitry 12 are practical.

In response to the synthetic horizons' respective error function values $\rho$, control logic 22 selects one of the synthetic horizons matching most closely with the observed horizon. The respective assumed pose of this selected synthetic horizon is referred to as the first selected pose. Then, process circuitry 12 again correlates the observed horizon with a new set of multiple synthetic horizons, corresponding to respective assumed poses centered at twice the initial resolution around the first selected pose. In response to the new set of synthetic horizons' respective error function values $\rho$, control logic 22 selects one of the new set of synthetic horizons matching most closely with the observed horizon. The respective assumed pose of this selected synthetic horizon is referred to as the second selected pose. From control logic 22, INS 16 inputs the second selected pose to advantageously update its navigational information.

In generating significant range discontinuities to delineate a synthetic horizon, feature generator 30 renders a two-dimensional image as viewed by a hypothetical observer from an assumed pose, in response to the three-dimensional map data stored in storage circuitry 28. Rendering is computationally demanding and is performed iteratively. Accordingly, feature generator 30 preferably includes high speed graphics processing hardware, such as a SILICON GRAPHICS IRIS 4D/70GT.

Such processing hardware further includes built-in features for readily determining significant range discontinuities from the map data. For example, feature generator 30 includes a z-buffer for storing ranges from the hypothetical observer to each pixel of the rendered two-dimensional image. Using the z-buffer, feature generator 30 readily determines a rate of change of range for each pixel over the entire rendered two-dimensional image. For a particular pixel, feature generator 30 determines a rate of change of range by differencing the z-buffer range value for the particular pixel with the average of z-buffer range values for pixels adjacent to the particular pixel.

Feature generator 30 extracts significant range discontinuities by identifying a histogram segmentation threshold for the rates of change of range. By applying the identified histogram segmentation threshold, feature generator 30 identifies a set of pixels having significant rates of change of range. The synthetic horizon is delineated by the identified set of pixels.

Image dimensions of a target object can be estimated from information concerning slant range and sensor optics. Moreover, important terrain features such as tree lines, roads and bridges are practically identified for a more diverse range of environmental conditions when approximate positions and attitudes relative to map data are provided in advance. Accordingly, relating a passive sensor to a geographic environment is applicable to autonomous guidance of robotic air vehicles, particularly for calibrating a Global Positioning System ("GPS").

Accurate determination of sensor position and attitude can affect ATR in several ways. By establishing approximate slant range as a function of pixel location, the image dimensions of a specific target object can be estimated. Uncertainty of viewing aspect is diminished by knowing the vertical look angle. These constraints are beneficial because they reduce the number of degrees-of-freedom to be resolved from the image alone.

Another benefit is that a "smart search" can be conducted, so that a search for target objects is focused in regions where target objects are most likely to be found. These regions are determined by tactical and physical considerations and are closely associated with terrain topography and such features as tree lines, roads, and bridges.

Due to accuracy considerations, a two tier search strategy is expedient. In the first tier, the map data guides a search for terrain features of interest. These are detected by appropriate pattern recognition techniques. There is relatively little ambiguity as to feature location because detection occurs directly in the image. In the second tier of the strategy, ATR algorithms are applied within regions of the image delineated by feature boundaries. Feature detection provides valuable contextual information. For example, a moving object on a road is likely to be a wheeled vehicle, aligned with the road, and pointed in the direction of travel. Moreover, autonomous navigation readily accommodates contemporary intelligence, such as, "Tanks spotted heading north from map coordinates . . . ". System 10 supports ATR by providing navigational accuracy.

An important design decision is the choice of features which link the real world of the image to the virtual world of the map data. A good feature preferably satisfies a number of requirements:

Reliably extractable from image

Computable from the map data

Sensitive to changes of any component of sensor pose

Robust, so that it is practical over a wide range of environmental conditions

Commensurate with the resolution of the map data

Sparsely distributed in scene

Amenable to efficient hardware implementation.

Since features from the image and map data originate from different sources, it is preferable to choose attributes that are directly comparable. Normally, the image contains a myriad of detail not represented in the map data. Much of this detail is subject to unpredictable temporal vicissitudes. The problem tends to diminish with the physical size of the attribute.

Options for feature selection depend on the complexity of the map data. Several levels of map complexity are possible: (a) digital terrain elevation ("DTED") maps having a list of elevations as a function of points on Earth's surface, (b) digital feature elevation ("DFAD") maps having qualitative feature descriptions such as road locations added to DTED maps, and (c) elevation maps combined with texture map overlays. Such texture map overlays are preferably taken from recent aerial photo reconnaissance. DTED maps are preferable based on simplicity and temporal stability over time. A disadvantage of DTED maps is that their application is limited to locales with suitable topography.

Topography is readily sensed from a special kind of image called a "depth map." In a depth map, range-to-object information is stored at each pixel location. However, it is difficult to get accurate depth maps from passive imagery. Optical flow fails to achieve sufficient resolution under some conditions of interest. Moreover, it is frequently impractical to quickly determine optical flow. Accordingly, range discontinuity is the preferred feature, because sensor requirements are less stringent by defining the feature in terms of qualitative, rather than quantitative, range information. Range discontinuity is defined as a locus of contiguous points delineating a boundary between objects at significantly different ranges.

System 10 detects features in response to intensity factors. Boundaries are normally visible in an image on the basis of contrast, color or texture. The process is greatly aided by a priori knowledge of a boundary's approximate location, size and shape from feature generator 30. Advantageously, navigational errors are constrained, since INS 16 updates its navigational information throughout the mission in response to estimated positions and attitudes from process circuitry 12.

In a large number of scenes, the dominant range discontinuity is the horizon. Consistently strong earth/sky contrast appears both during the day and at night under clear weather conditions in standard FLIR imagery. Horizon contours frequently exhibit qualities of being extended and of varying considerably in depth relative to an observer. It is normally practical to navigate in response to such a horizon contour.

Preferably, platform 20 adjusts passive sensor 14 to substantially offset vehicle roll. Uncompensated roll is preferably accommodated by system 10. Notably, the attitude component of sensor pose affects the image through rotations and translations and can be modeled as a linear transformation. These are dealt with internally by feature comparator 32. All contours sent to feature comparator 32 are resampled for constant arc length between samples.

Preferably, features promote strong perspective effects. Such features tend to have large angular extent in the image and to include elements over a wide span of range. Resolution is preferably high to permit discerning of subtle changes. Control logic 22 analyzes the array of assumed poses to determine the assumed pose exhibiting least non-linear distortion.

Figure 4:
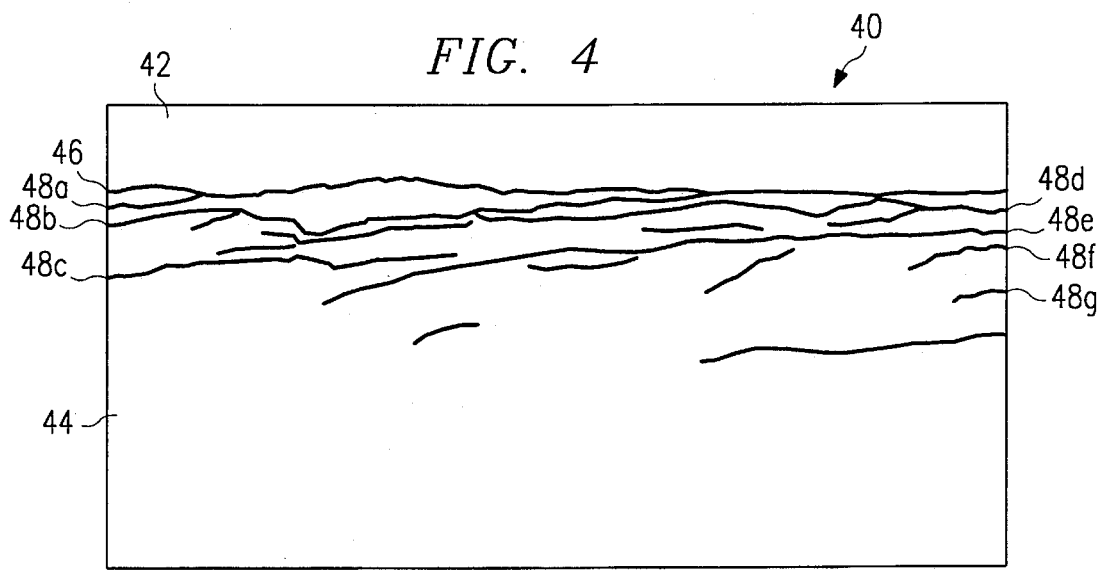
FIG. 4 illustrates multiple intraterrain discontinuity contour boundaries superimposed over the image of FIG. 2.

FIG. 4 illustrates multiple intraterrain discontinuity contour boundaries 48a–g superimposed over image 40 of FIG. 2. Accordingly, it should be understood that system 10 is also able to relate passive sensor 14 to the geographic environment in response to multiple intraterrain contours other than the horizon. In doing so, process circuitry 12 selects the most promising features from the map data. Process circuitry 12 performs the following steps:

Step 1. Render image from map data for assumed pose;

Step 2. Transform z-buffer data to invert nonlinear mapping and restore true z-coordinates;

Step 3. (optional). Process transformed data pixel-by-pixel to convert from z-coordinates to slant ranges;

Step 4. Process to locate and quantify range discontinuities.

Step 5. Construct histogram of range discontinuity magnitudes and select threshold so that a predetermined fraction of range discontinuity magnitudes exceed the threshold;

Step 6. Apply threshold and reject weak range discontinuities;

Step 7. Segment non-rejected contours according to a connected object detection algorithm;

Step 8. Rank segmented contours by length and retain N longest, where N is a specified number.

Process circuitry 12 performs Step 2 because the z-buffer values are not the z-coordinates themselves, but instead are a function of the z-coordinates. The output of Step 2 depends on the choice of clipping planes in rendering and is inverted to achieve the suitable data. At Step 3, process circuitry 12 converts z-coordinates into slant ranges. While desirable in principle, Step 3 is computationally demanding with little advantage; accordingly, Step 3 is optional. At Step 4, process circuitry 12 determines the distribution of range discontinuity magnitudes in the image.

From the distribution, at Step 5 process circuitry 12 selects a threshold so that a predetermined fraction (e.g., 10%) of range discontinuity magnitudes exceed the threshold. Referring to the output of Step 5 shown in FIG. 4, in an exemplary embodiment, feature extractor 26 extracts significant range discontinuities to delineate multiple intraterrain discontinuity contour boundaries 48a–g, in response to intensity and color differences within image 40. Notably, observed horizon 46, being the strongest discontinuity, is also included.

At Step 6, process circuitry 12 applies the threshold from Step 5 to reduce the number of range discontinuity elements under consideration. At Step 7, process circuitry 12 uses a connected object algorithm to assign a single unique label to each contour. At Step 8, process circuitry 12 ranks each labelled contour according to its length in image 40. All but a specified number N of longest contours are rejected, so that the longest N contours form the set of selected features. After a feature contour is defined, it is optionally extendable to include slightly weaker adjoining elements.

Intraterrain discontinuities are extractable from the image according to any of several possible techniques. By knowing the shape and location of a feature contour a priori, an exemplary technique applies snakes as active contour models. According to such an exemplary technique, a component of the snake's energy function is minimum where the snake conforms to the expected shape. The difficulties presented by local minima are substantially addressed by the small uncertainty concerning the feature contour's shape and location.

Although the present invention and its advantages have been described in detail, it should be understood that various changes, substitutions and alterations can be made therein without departing from the spirit and scope of the invention as defined by the appended claims.

What is claimed is:

1. A system for relating a passive sensor to a geographic environment, the passive sensor being operable to sense an image of the geographic environment, comprising:

storage circuitry for storing map data having predetermined levels of complexity to relate with the image and representative of the geographic environment; and process circuitry coupled to said storage circuitry and to the passive sensor and operable to:

extract at least one image range discontinuity from the image;

generate at least one map range discontinuity from said map data; and relate said at least one said extracted image range discontinuity to said at least one said generated map range discontinuity with said predetermined levels of complexity, such that the passive sensor is related to the geographic environment.

2. The system of claim 1, wherein said process circuitry is operable to relate a position and attitude of the passive sensor to the geographic environment.

3. The system of claim 2, wherein said system further comprises an inertial navigation system coupled to said process circuitry for determining navigational information, wherein said inertial navigation system is operable to update said navigational information in response to said related position and attitude.

4. The system of claim 1, wherein said range discontinuity comprises a discontinuity contour boundary within the image between objects of the geographic environment at significantly different ranges away from the passive sensor.

5. The system of claim 1, wherein said range discontinuity comprises an intraterrain discontinuity contour boundary within the image.

6. The system of claim 1, wherein said extracted image range discontinuity comprises an observed horizon extracted from the image.

7. A method relating a passive sensor to a geographic environment, comprising the steps of:

sensing an image of the geographic environment with the passive sensor;

extracting at least one image range discontinuity from the image;

generating at least one map range discontinuity from map data having predetermined levels of complexity to relate to the image and representative of the geographic environment; and relating at least one said extracted image range discontinuity to at least one said generated map range discontinuity with said predetermined levels of complexity, such that the passive sensor is related to the geographic environment.

8. The method of claim 7, wherein said relating step comprises the step of relating a position and attitude of the passive sensor to the geographic environment.

9. The method of claim 8, wherein said method further comprises the step of updating navigational information of an inertial navigation system in response to said related position and attitude.

10. The method of claim 9, wherein said extracting step comprises the step of delineating a discontinuity contour boundary within the image between objects of the geographic environment at significantly different ranges away from the passive sensor.

11. The method of claim 10, wherein said delineating step comprises the step of delineating an intraterrrain discontinuity contour boundary within the image.

12. The method of claim 7, wherein said extracting step comprises the step of extracting an observed horizon from the image.

* * * * *